United States Patent [19]

Lowe et al.

[11] 4,051,024

[45] Sept. 27, 1977

[54] OIL RECOVERY APPARATUS AND METHOD

[75] Inventors: John G. Lowe, Pequannock; Roy I. Butler, Kinnelon, both of N.J.

[73] Assignee: Lowe Engineering Company, Lincoln Park, N.J.

[21] Appl. No.: 653,501

[22] Filed: Jan. 29, 1976

[51] Int. Cl.$^2$ .................. B01D 15/02; B01D 15/06
[52] U.S. Cl. .................... 210/30 A; 210/73 W; 210/242 AS; 210/DIG. 26
[58] Field of Search ......... 210/30 A, 730 W, 242 AS, 210/DIG. 25, DIG. 26

[56] References Cited

U.S. PATENT DOCUMENTS

| 3,358,838 | 12/1967 | Kosar et al. | 210/242 S |
|---|---|---|---|
| 3,905,902 | 9/1975 | Hoegberg | 210/DIG. 25 |

OTHER PUBLICATIONS

Offenlegungsschrift, No. 1,459,419, Jan. 1969, Justus, Otto, "Oil Skimmer for Water".

*Primary Examiner*—Frank A. Spear, Jr.
*Assistant Examiner*—Richard W. Burks
*Attorney, Agent, or Firm*—Ralph R. Roberts

[57] ABSTRACT

There is shown an oil recovery apparatus and method which includes a plurality of like-sized disks carried on a rotatable shaft. These disks are partially immersed in the fluid which contains the unwanted oil or oil-like material to be removed or recovered from the larger body of fluid. The disks are preferably of plastic or are plastic coated and during immersion the oil contaminator is picked up by and with the engagement of the disks in the oil portion of the fluid after which plastic scraper blades engage the sides of the disks to remove this oil from the sides of the rotating disk. The scrapings which are removed are fed by a channel guideway or ways to a collector. Two arrangements of plastic scraper assemblies are shown. In one embodiment there are two blades arranged to straddle the disk and simultaneously scrape opposite sides of this disk as the disk is rotated. The removed oil is carried by two conductors to a collector. In the other arrangement the scraper assembly carries a blade which extends outwardly to engage and scrape facing surfaces of two adjacent disks. The scraped oil is fed to a common conductor and then to a collector. The scraper normally includes two plastic ribbon scraping portions, each of which are bent into a scraping angle as they are pressed into scraping engagement with a side of the disk. The scraper units are readily removable from the collector apparatus for cleaning and/or repair and the strips of plastic which form the scrapers are readily and inexpensively replaced.

16 Claims, 7 Drawing Figures

OIL RECOVERY APPARATUS AND METHOD

BACKGROUND OF THE INVENTION

1. Field of the Invention

With reference to the classification of art as established in the U.S. Patent Office the present invention is found in the general Class entitled, "Liquid Purification or Separation" (Class 210) and the subclasses therein entitled, "with mechanical agitator or movable separator" (subclass 179) and the subclass in the digests entitled, "oil removal from water surface" (Digest 21).

2. Description of the Prior Art

Oil recovery systems are not new and are extensively used to pick up oil spills and the like particularly from ocean and inland waterways. Generally these oil recovery systems utilize a belt or a scraper-type apparatus and use a flotation system to separate the oil from the water or similarly contaminated liquid. In these and other known apparatus the recovery apparatus is both expensive and cumbersome and usually lacks efficiency. When a belt is used to accumulate the oil the squeezing of the oil from the belt often removes a small amount of water. The belt also requires frequent cleaning, and repair of the belt is time consuming and expensive. Even the detection of oil on water is an expensive proposition. This is particularly true in commercial installations where treated fluids are contaminated with unwanted oil as, for example, in the fluids used for grinding and the like.

In the present invention the oil recovery apparatus includes a simple frame upon which is mounted a motor which by a belt or chain drives a shaft on which is mounted a series of like disks. These disks, it has been found, are most efficient if they are made of a plastic which has a particular affinity for oil and petroleum products. Particularly effective in the pickup of oil has been polyethylene. In the embodiments to be hereinafter more fully described, these disks are preferably made of rigid polyethylene. The scrapers associated with these disks are ribbons of plastic and, as hereinafter more fully described, are Nylon strips which are bent to provide scraping edges which are pressed against the sides of the rotating disks.

In use the disks are rotated in a partly immersed condition and as they are rotated are sequentially lifted from the contaminated fluid and then are returned to an immersed condition. The scraped residue of oil removed just prior to reimmersion is fed to a conductor and then to an accumulator. As reduced to practice, the oil pickup efficiency of this disk skimmer is very good. Continued rotation of the disks in the contaminated water and the continuous scraping of the disks removes substantially all of the oil in a very short period of time.

SUMMARY OF THE INVENTION

This invention may be summarized in part by reference to its objects.

It is an object of this invention to provide, and it does provide, an oil recovery system in which rotating disks are partly immersed in the contaminated fluid and by a simple scraping action on the rotating disks prior to their re-entry into the fluid the oil picked up by these disks is removed from the sides of the disks by the scraper blades and is fed by conductors to an accumulator.

It is a further object of this invention to provide, and it does provide, a method for the ready removal and replacement of the plastic ribbons used for scraping of the oil from the disks of the recovery assembly, to be hereinafter more fully described.

The apparatus of this invention utilizes a series of like rotating disks preferably made of polyethylene plastic and rotated at a slow speed. The lower portion of these disks is immersed in the fluid which contains oil, oil-type products or petroleum based products which are to be removed from the large body of fluid.

The scraper assemblies, to be hereinafter more fully described, are of two configurations. In one arrangement the scraper assembly consists of two plastic ribbons which are carried by paired conductors and straddle a disk to scrape both sides of the common disk to remove the picked up oil. In another arrangement the scraper assembly consists of one plastic ribbon which is carried by a common conductor. This ribbon has projecting portions which are disposed to engage and scrape the accumulated oil from the facing sides of adjacent disks. The removed accumulated oil flows down the common conductor. In both arrangements the scraper ribbon is made of thin plastic which is twisted to achieve the desired plow effect. These ribbons are of Nylon with a sufficient stiffness to provide the bias necessary to retain the bent ribbons in tight engagement with the sides of the disks or disk to be scraped.

These ribbons are readily removable and replaceable in the scraper assemblies of which they form a major part. These assemblies are readily removable from the oil recovery apparatus when cleaning and/or repairs are to be made. In one embodiment, to be hereinafter more fully illustrated and described, there is shown the oil recovery apparatus wherein the disks and scraper assemblies are protected by a cover from rain, splashing and waves so that the residue material scraped from the disks and collected is free from water as much as possible. Whether the motor is an electric motor, which is preferable, or another type of power apparatus it is contemplated that the rotating plastic disks be turned at a slow enough speed so that the oil in the contaminated fluid, when brought into engagement with the disks is attracted by the disks and is picked up by the disks as the disks emerge from the fluid. As the disks are rotated and reach the downward rotational portion of the rotation of the disks and before they re-enter the immersed fluid the edges of the plastic scraper blades are brought into contact with the sides of the disks to remove the oil picked up by the rotating disks. This scraped residue is fed by conductors to an accumulating system.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen two specific embodiments of the oil recovery apparatus and the removable scraper assemblies as adopted for use with water contaminated with oil and showing a preferred means for removing the oil or petroleum from the water. These specific embodiments have been chosen for the purposes of illustration and description as shown in the accompanying drawings wherein:

BRIEF DESCRIPTION OF THE DRAWINGS

FIG. 7 represents a somewhat diagrammatic side view, in a reduced scale, of an oil recovery apparatus like that of FIG. 2 and 5 but with a cover which prevents unwanted entry into the accumulated scrapings from the disks of water and the like which may occur because of waves, splashing, rain and the like.

In the following description and in the claims various details are identified by specific names for convenience. These names are intended to be generic in their application. Corresponding reference characters refer to like members throughout the several figures of the drawings.

The drawings accompanying this specification disclose certain details of construction for the purpose of explanation but it should be understood that details may be modified in various respects without departure from the concept of the invention and that the oil recovery and scraper apparatus may be incorporated in orther forms than shown.

DESCRIPTION OF THE EMBODIMENT OF FIGS. 1, 2 AND 3

Figure 2:
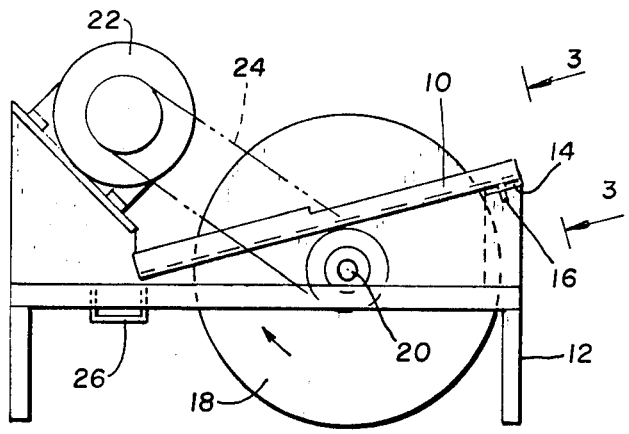
FIG. 2 represents a somewhat diagrammatic side view in a reduced scale of an oil recovery apparatus and employing a scraper assembly as shown in FIG. 1 with a scraper assembly employed with each of the rotating disks.
Figure 3:
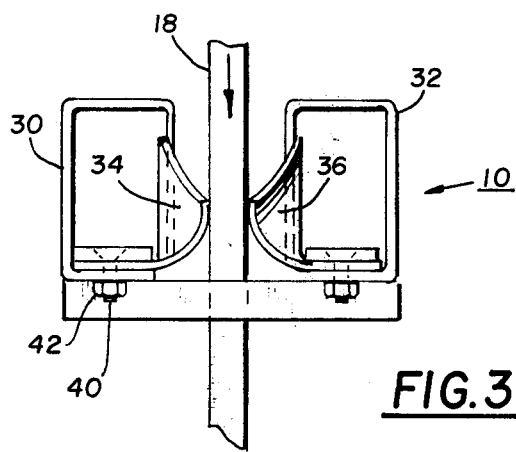
FIG. 3 represents an end view, partly diagrammatic, of the scraper assembly of FIG. 1 with the scraper blades in effective scraping engagement with a rotating disk used with the oil recovery apparatus, this view taken on the line 3—3 of FIG. 2 and looking in the direction of the arrows.
Figure 1:
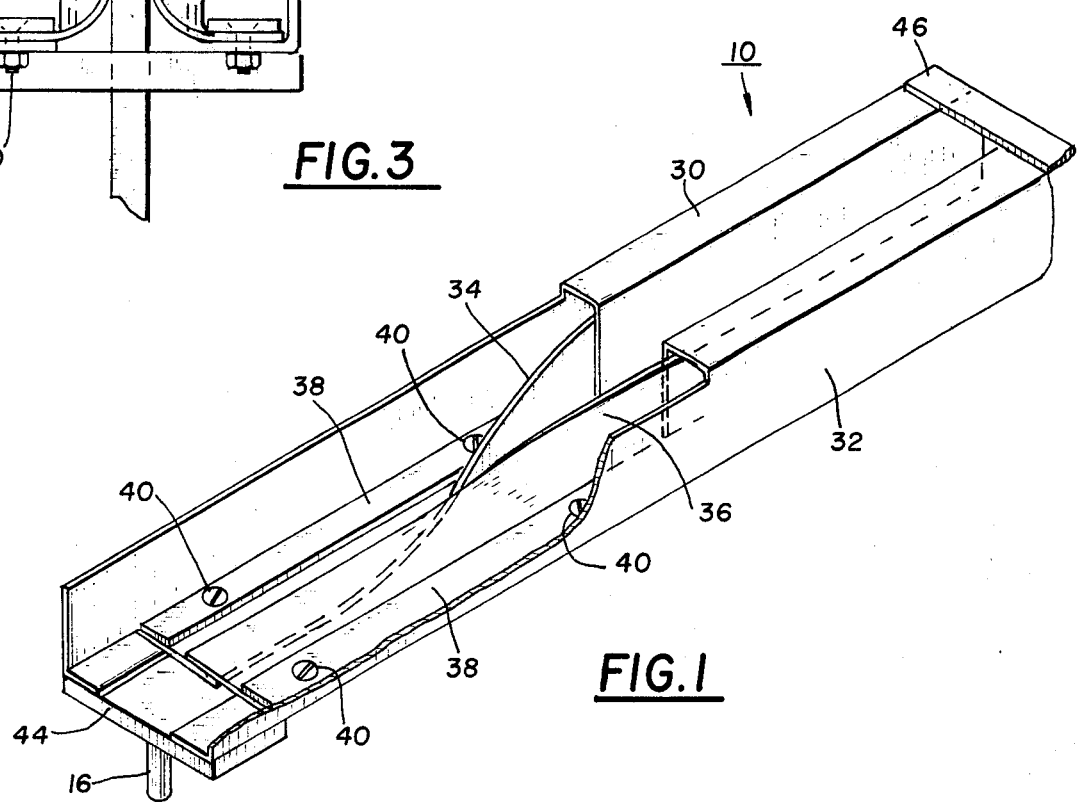
FIG. 1 represents an isometric view of a scraper assembly in which two curved plastic scraper blades are retained in a frame and are arranged to straddle and scrape the picked up oil from both sides of the same rotating disk.

Referring next to the recovery apparatus shown in FIGS. 1, 2 and 3, there is depicted a scraper assembly generally identified as 10 which is removably carried by a frame 12 providing a general support for the oil recovery system. The right or front end of frame 12 provides a support shelf 14 having a plurality of spaced apertures for receiving and retaining pins 16. Carried on frame 12 is a plurality of plastic disks 18 which may be carried on a common shaft 20 driven by a motor 22 through a chain or belt 24. Depending upon whether it is a roller chain or a V-belt appropriate sprockets or sheaves are used with the motor and the shaft to couple this shaft to the power source.

As seen in FIG. 2, the scraper assembly 10 is supported at an angle so that a gravity discharge may be used to deliver the accumulated scrapings from the disk 18 into a common collector 26. This collector feeds the residue to an accumulator or other disposing means. Referring particularly to FIGS. 1 through 3, it is to be noted that the scraper assembly 10, in this particular embodiment, shows and utilizes two rectangular tube portions 30 and 32. The bore portion of the top and inner side of each of these tubes is cut and removed to provide an outer support rib and a bottom support surface. Two plastic strips identified as 34 and 36 are carried by the conducting tubular members 30 and 32. The plastic strip 34 is carried in rectangular tube 30 and the near plastic strip 36 is carried in rectangular tube 32. The strip 34 is held in a twisted condition by means of an attached hold down strip 38. The right end of the plastic strip 34 is vertically retained by the tubular portion 30 and is twisted a quarter turn with the left end portion held in a flat condition by retaining strip 38. This strip 38 is retained by flat head screws 40 which pass through apertures in both the plastic strip and in the bottom portion of the tubular portion 30. This screw or bolt 40 is retained by hex nuts 42. In a like manner the plastic strip 36 has its right end carried in the rectangular tube 32 where it is retained in the vertical condition against the inner wall of the tube. The near plastic strip 36 is twisted and the left or forward end is brought to a flat condition overlaying plastic strip 34. This strip is held in position by hold-down strip 38 and screws 40 and hex nuts 42. The screw 40 passes through apertures in the plastic strip 36 and in the flat bottom portion of the tubular member 32 to be retained by hex nuts 42. Tubes 30 and 32 are held in spaced relationship at the far or right end by a retaining bar 44. The tubes 30 and 32 are attached to bar 44 as by welding, brazing or soldering. The upper right end portions of tubes 30 and 32 are held in spaced relationship by means of support bar 46 which may be secured to the tubular members 30 and 32 also as by welding, brazing or silver soldering. The retaining pin 16 is secured in the flat retaining bar 46 by threads of welding or the like. No matter how this pin is secured it is permanently affixed so that it is not lost or misplaced.

USE AND OPERATION OF THE OIL RECOVERY APPARATUS OF FIGS. 1, 2 AND 3

As seen in FIG. 2, the disks 18 are mounted on shaft 20 and are rotated by motor 22 in the direction indicated by the arrows. A scraper assembly 10 is placed above a disk with the discharge ends of the tubes 30 and 32 to the left. The discharge ends are disposed to drain into the collector 26. The plastic strips 34 and 36 are placed over the disk 18 and are pushed downward over the disk to assume the position, as seen in FIG. 3. The natural bias or stiffness of these strips cause the edges of the strips to be pressed inwardly against the side of the disk to scrape the sides of the disk. The length of the effective scraping blade is approximately five or six inches. Pin 16 of the scraper assembly 10 is mounted in the aperture formed in shelf 14 and in mounted condition positions and retains the scraper assembly in the desired orientation and at a desired angle or slope. As depicted in FIG. 2, this arrangement provides a gravity flow of the oil scraping carried in the tubular conductors provided by tubular members 30 and 32.

It is, of course, contemplated that instead of the pins 16 being fixed to and carried by the retaining bar 44, apertures may be formed in bar 44 and an appropriate number of pins 16 may be permanently secured to the shelf 14. This aperture, when formed in bar 44, permits the scraper assembly 10 to be positioned in the desired attitude and position in respect to a rotating disk 18. Whether the pin 16 is carried by the scraper assembly or is secured to the shelf 14 is merely a matter of selection since the pin establishes the position of the scraper assembly in relation to the rotating disk. To replace the strips 34 and 36 it is only necessary that the scraper assembly be lifted from the frame 12. Screws 40 are loosened from the nut 42 and the retaining strip 38 is lifted and removed from the tubular portions 30 and 32. The strips 34 and 36 are removed by sliding them from the tubular members and if they are excessively worn they are discarded. New strips 34 and 36 with appropriate holes punched therein are then positioned in the tubes 30 and 32 and with hold-down strips 38, screws 40 and nuts 42 are secured into position to tightly retain the plastic strips in the desired twisted attitude in the tubular conductors 30 and 32.

The scraper assembly is brought from the top downwardly over the rotating disk 18 and scraper edges by the method of assembly are inherently moved upward. By the stiffness of the plastic and the created bias in the plastic strips there is achieved a tight scraping engagement of the plastic strips against the sides of the disk 18. It is contemplated that the disk 18 be made of rigid polyethylene which has a great affinity or attraction for oil which then clings to the side surfaces of the disk. The scraper strips 34 and 36 are contemplated to be made of nylon and are approximately a thirty-second of an inch in thickness. These strips are arranged so that about 6 inches of the protruding edge is in engagement with the disk to scrape the lifted oil from the sides of the rotating disk.

ARRANGEMENT OF FIGS. 4, 5 AND 6

Figure 4:
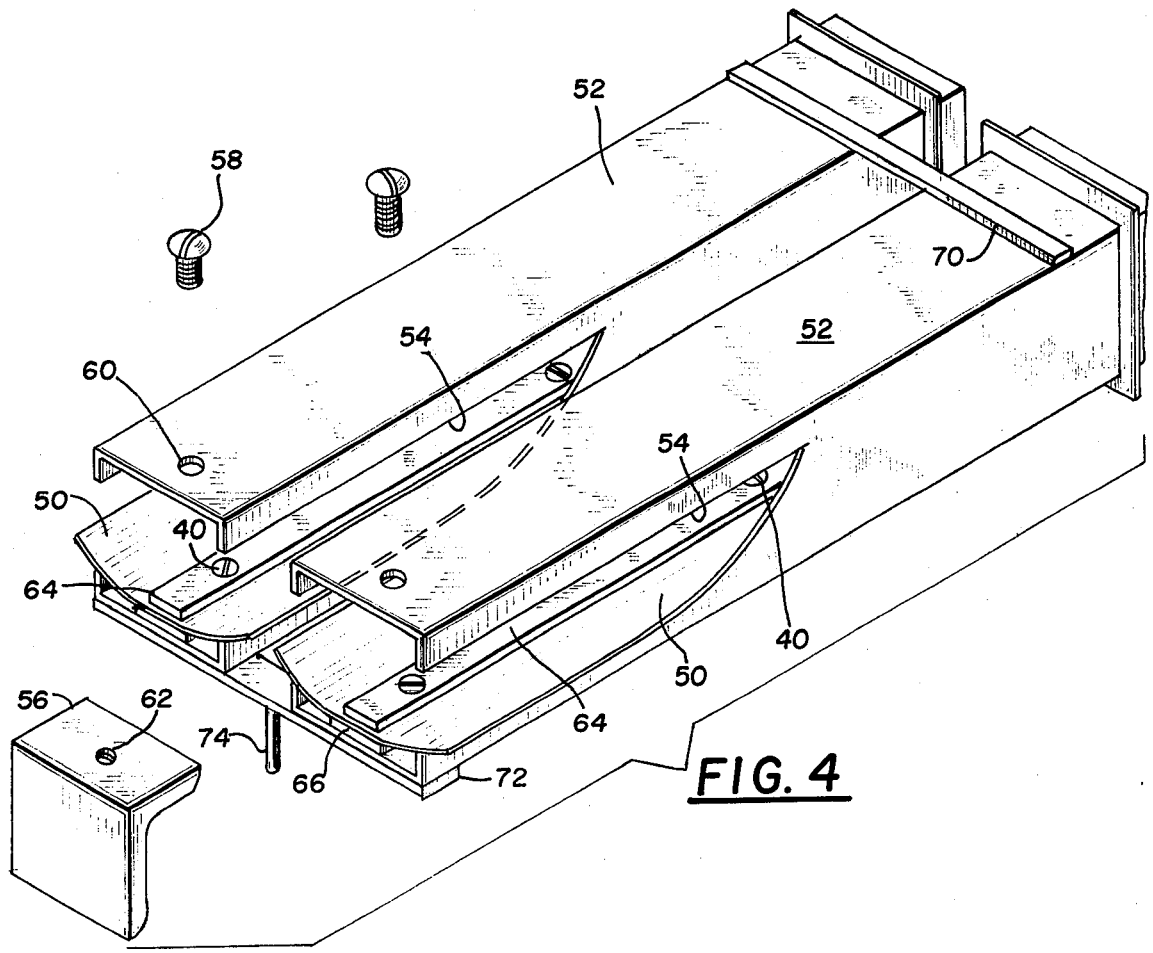
FIG. 4 represents an isometric view of a scraper assembly in which a curved plastic scraper blade is carried by and in a frame and is arranged so that projecting portions of this blade engage facing surfaces of two adjacent rotating disks and scrape the picked up oil from these surfaces.
Figure 5:
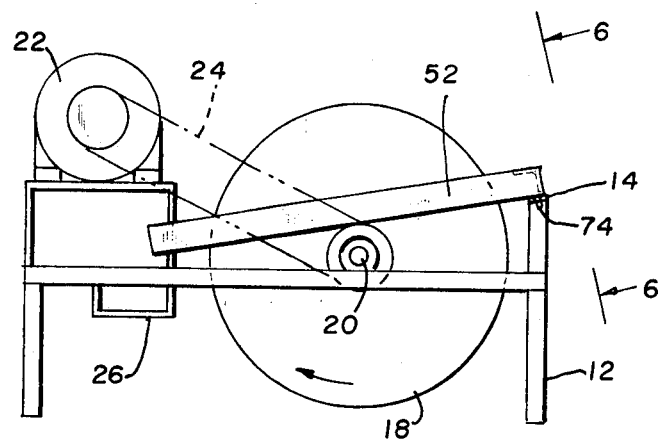
FIG. 5 represents a somewhat diagrammatic side view, in a reduced scale, of an oil recovery apparatus which employs between adjacent disks the scraper assembly of FIG. 4.
Figure 6:
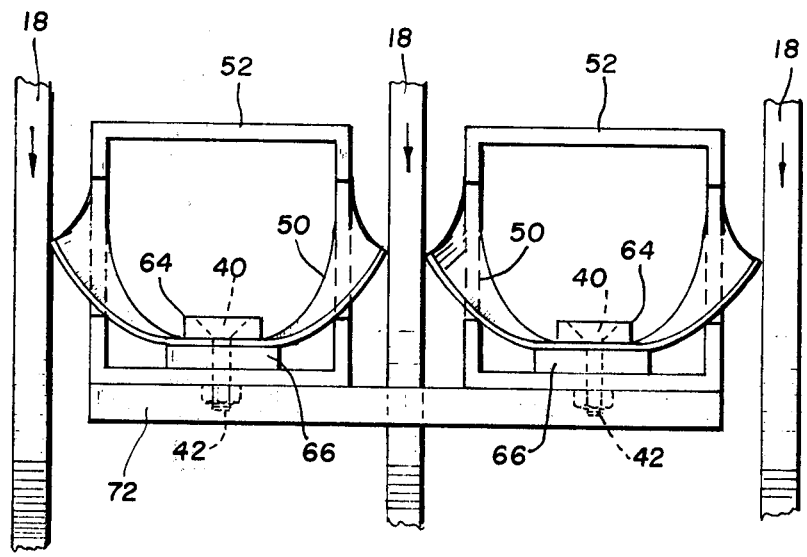
FIG. 6 represents an end view, partly diagrammatic, of the scraper assembly of FIG. 4 with the two extending edges of the scraper blade in effective scraping engagement with the facing surfaces of two adjacent rotating disks of the oil recovery apparatus, this view taken on the line 6—6 of FIG. 5 and looking in the direction of the arrows.

Referring next to the oil recovery system shown in FIGS. 4, 5 and 6 it is to be noted that in FIG. 4 instead of the two plastic strips carried in a scraper assembly, as in FIG. 1, there is one plastic strip carried in a rectangular conductor. This plastic strip is identified as 50 and is carried in a rectangular conductor identified as 52. The forward or left portion of this conductor is formed with a cut out portion 54 in both side walls which provides a shelf and opening for the outward extension of the plastic strip 50. At the same time the closed rear portion of the conductor causes the plastic strip to curve upwardly and inwardly to direct the scraped residue from the sides of the disk to flow into and down the conductor 52. The forward end of the tubular members 52 is covered or closed by means of an angle bracket 56 which covers the end of each of the rectangular conductors 52. Each angle bracket 56 is held in place by means of screw 58 which passes through aperture 60 formed in the end of tubular conductor 52. A screw 58 passes through aperture 60 into a threaded aperture 62 in the angle 56.

In the embodiment of FIGS. 4 and 6, it is to be noted that the tubular conductors 52 are shown as arranged in pairs. When this is to be accomplished a rear tie-bar 70 is attached to the upper rear surface of the conductors 52. The front portion of the conductors on its underside is secured to a support bar 72. Secured in and to this bar 72 is positioning pin 74 which fits into apertures formed in the front shelf of the frame. This is depicted in FIG. 5 in which the mounting is like that of FIG. 2. Frame 12 carries a front shelf 14 which has apertures therein for the placing of pins 74 which position the front end of the conductors 52. If the conductors are not mounted as pairs and are arranged as single units a pin 74 is secured to each conductor 52. In position the strip 52 scrapes opposite faces of adjacent disks 18 which are carried by shaft 20 as in the manner of FIG. 2. Motor 22 and power transmission member 24 are also similar to the drive above-described.

Referring to FIG. 6, it is to be noted that in use the assembly of FIG. 4 is positioned with the scrapers 50 in engagement with the sides of the disk 18. The scraper assemblies are brought into a rest position upon the front shelf 14 with the pin 74 fitting appropriately positioned apertures in this shelf. In this condition the scraper assemblies are carried by the frame so that the supported tubular conductors 52 rest at a sloped angle sufficient for the scraped oil residue to be gravity fed to and along the conductor and to the collector 26.

EMBODIMENT OF FIG. 7

Figure 7:
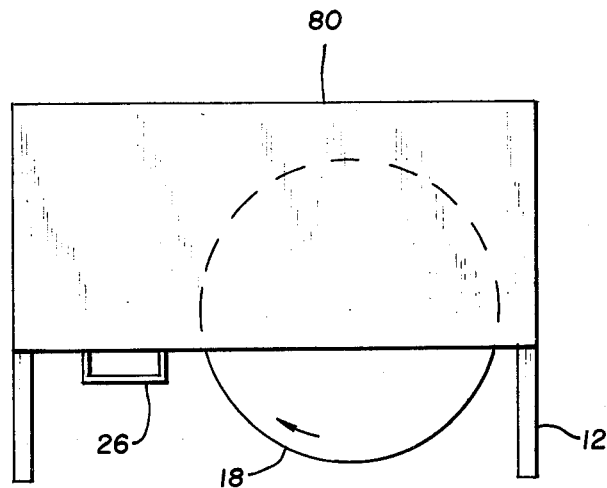

Referring next and finally to FIG. 7, there is shown an oil recovery apparatus which provides for those instances when it is desirable that oil residue removed from the contaminated fluid be kept as free from water as possible. Without protection rain and the like may enter the scraping troughs adjacent the rotating disks 18 unless prevented by cover means. In the apparatus of FIG. 7 there is shown a cover 80 which is retained by and on the frame 12 and is disposed to extend substantially to or near the top level of the fluid from which the oil or petroleum product is to be removed. The collector 26 is shown as extending below this cover, however, the method of accumulation and removal of the fluid in the collector is merely a matter of choice and as long as unwanted water from rain, splashing or waves is kept from this collector then the matter of water residue is limited to that picked up from the water by the rotating disk and unwanted fluid is kept to the absolute minimum.

It is also to be noted that the scraper assembly 10 of FIG. 1 cleans or scrapes only one disk. For every disk 18 a scraper assembly 10 is required. However, the scraping of all the disks in an oil recovery apparatus cannot be achieved with scraper assemblies as shown in FIG. 4. Additional and special scraper assemblies, not shown, are required. These special scrapers are required to accommodate the outwardly facing surfaces of the two end disks. When these end disks are to be cleaned a modification of the assembly of FIG. 4 is required. Only one projecting blade portion is needed with these outer collectors. This projecting blade projects only inward. These special outer conductors need have a cutout only in one side panel from which a plastic scraper extends. A right and left-hand assembly is required. No matter which and how the collector assemblies are arranged, it is anticipated that thin plastic strips will be bent to scrape the side surfaces of the disks, which strips are preferably of plastic or are plastic coated. The provided scraper assemblies may be readily removed from the support frame and the scraper blades may be readily removed from the scraper assemblies for replacement, repair and/or cleaning. As above noted, whether a pin 74 or 16 is carried by the scraper assemblies to mount into apertures in the support shelf or when a reverse or other arrangement is desired it is only necessary that the collector assemblies be positively positioned and prevented from moving forwardly or rearwardly in relation to the axis of the rotating disk.

Terms such as "left", "right", "up", "down", "bottom", "top", "front", "back", "in", "out" and the like are applicable to the two arrangements shown and described in conjunction with the drawings. These terms are merely for the purposes of description and do not necessarily apply to the position in which the oil recovery apparatus and the removable scraper assemblies may be constructed or used.

Although the above disclosure is particularly directed toward oil and like petroleum products it has been found that other contaminators may be removed by this apparatus. As long as the contaminating material floats at or near the top of the contaminated liquid and has an affinity to the plastic coating or material that the disks are made of, the apparatus and method of recovery is highly efficient. Among the contaminators other than oil and petroleum products are some plastic resins, food particles and/or small scraps, greases in a semi-liquid state and fatty acids.

While particular scraper assemblies have been shown and described it is to be understood the invention is not limited thereto since modifications may be made within the scope of the accompanying claims and protection is sought to the broadest extent the prior art allows.

What is claimed is:

1. An oil recovery apparatus which removes oil, petroleum and like contaminating products as they float on or near the surface of a contaminated fluid, the apparatus including: (a) a support frame; (b) a multiplicity of substantially like-sized disks rotatably carried on and by said frame and when the frame is in operative use and position these disks are supported and rotated so as to be partially immersed in the contaminated fluid with the oil in the contaminated fluid contacting the side surfaces of the immersed disk, these side surfaces of the disks having an affinity for retaining oil and oil products and as the disks are rotated the floating oil in the contaminated fluid is attracted to the sides of the disk sufficiently for the oil to be lifted from the contaminated fluid; (c) a scraper assembly including at least one flexible ribbon associated with each disk, said scraper assembly providing a support for the flexible ribbon which during a portion of the supported length is bent so as to extend in a plane which is slightly upward from a plane parallel to the axis of the disk when the scraper assembly is in mounted scraping condition, the ribbon portion is arranged to provide at least one extending portion of ribbon which when in engaged condition with the disk is bent to provide a bias causing the edge of the extending portion of this ribbon to snugly engage the side of a disk to scrape the side of said rotating disk to remove the collected oil prior to the re-entry of the disk into the contaminated fluid, said scraper assembly including at least one tubular conductor which provides at least a portion of the scraper support, said scraper assembly being readily removable from the support frame and in mounted condition the tubular conductor is sloped so that the discharge exit is below that portion having the scraper ribbons, this scraper assembly arranged so that one end rests on the support frame and is positively positioned at and in a selected orientation, this scraper assembly in mounted condition presenting the extending portion of the ribbon to the side of the rotating disk after the disk has reached its zenith and is on its downward movement prior to its re-entering the contaminated fluid, the conductor which is associated with each blade is adapted to receive the scraped oil from the disk and conduct the oil to a discharge end; (d) an accumulator adapted to receive the oil from the conductors and collect the accumulation for further disposition, and (e) power means associated with the disks and adapted to turn these disks in a prescribed direction and at a selected speed.

2. An oil recovery apparatus as in claim 1 in which the outer side surfaces of the disks are polyethylene and the ribbon scraper is of Nylon.

3. An oil recovery apparatus as in claim 2 in which the selected orientation includes a pin carried by the scraper assembly and there is provided an associated aperture in the frame.

4. An oil recovery apparatus as in claim 1 in which the scraper assembly includes two ribbons arranged so that the extending portions are directed toward each other and with the secured portion of the ribbons curving upwardly and outwardly to a conductor by which the scraped oil from the rotating disk is scraped from the sides of the disk and is fed to the accumulator, said scraper assembly having the ribbons and the extending portions arranged to engage and scrape opposite sides of a single disk.

5. An oil recovery apparatus as in claim 1 in which the scraper assembly has at least one ribbon carried in a conductor and with a portion of the ribbon extending outwardly from the conductor and with the ribbon curving upwardly and inwardly toward and to engage the conductor by and through which the scraped oil from the sides of the rotating disk is fed to the accumulator, and in which the extending ribbon portions engage facing sides of adjacent rotatable disks.

6. An oil recovery apparatus as in claim 5 in which the ribbon is a single strip formed and retained in a general U-shape and retained in a single tubular conductor.

7. An oil recovery apparatus as in claim 1 in which the disks are of high density polyethylene carried on a common shaft in spaced array and with the shaft rotated by a motor and a connected power transmitting means.

8. An oil recovery apparatus as in claim 1 in which each scraper assembly has the ribbon portions arranged to provide only two scrapers by which to remove the oil from the rotating disk.

9. An oil recovery apparatus as in claim 1 in which the ribbons are of Nylon and are approximately one thirty-second of an inch in thickness.

10. An oil recovery apparatus as in claim 1 in which the apparatus is provided with a cover by which the disks and the conductors associated with the scrapers are shielded from spray, waves and other sources of fluid which would add unwanted fluid to the oil scraped from the rotating disk.

11. A method of oil recovery which is disposed to remove oil, petroleum and like contaminating products as they float on or near the surface of a fluid in which it is the contaminator, the method steps including: (a) providing a support frame; (b) mounting on this frame a multiplicity of substantially like-sized disks and rotatably carrying on and by said frame these disks so that as they are supported and rotated they are partially immersed in the contamination fluid with the oil in said fluid contacting the side surfaces of the immersed disk, the side surfaces of these disks having an affinity for retaining oil and like petroleum products and as the disks are rotated the floating oil in the contaminated fluid is attracted to the sides of the disk sufficiently for the oil to be lifted from the contaminated fluid on the sides of the disks; (c) providing a scraper assembly which includes at least one flexible ribbon associated with each disk, said scraper assembly providing a support for the flexible ribbon and securing a portion of the supported length so that during this extent it is bent when in engagement with the side of a disk to extend in a plane which is slightly upward from a plane parallel to the axis of the disk when and while the scraper assembly is in mounted scraping condition, the ribbon portion arranged to provide at least one bent portion which provides a bias causing the edge of the extending portion of this ribbon to snugly engage the side of a disk to scrape this side of said rotating disk to remove the collected oil prior to the re-entry of the disk into the contaminated fluid, said scraper assembly including at least one tubular conductor which provides at least a portion of the scraper support and forming said scraper assembly so as to be readily removable from the support frame and mounting the tubular conductor in a sloped attitude so that the discharge exit is below that portion having the scraper ribbons and arranging this scraper assembly so that one end rests on the support frame and is positively positioned at and in a selected orientation, this scraper assembly in mounted condition presenting the extending portion of the ribbon to the side of the rotating disk after the disk has reached its zenith and is on its downward movement prior to its re-entering the contaminated fluid; (d) providing a conductor which in association with each blade is adapted to receive the scraped oil from the disk and conduct this oil to a discharge end of the conductor; (e) providing an accumulator which is adapted to receive the oil from the conductor and collecting this accumulation of oil for further disposition, and (f) providing a power means which in association with the disks is adapted to rotate these disks in a prescribed direction and at a selected speed.

12. A method of oil recovery as in claim 11 which includes the further step of forming the disks so that the outer side surfaces are polyethylene and forming the ribbon scraper portions of Nylon.

13. A method of oil recovery as in claim 11 which further includes providing the scraper assembly with two ribbons arranged so that the extending portions are directed toward each other and securing a portion of the ribbon so that the secured portion curves upwardly and outwardly to a conductor by which the scraped oil from the rotating disk is scraped from the sides of the disk and is fed to the accumulator, and constructing said scraper assembly so that the ribbons and their extending portions are arranged to engage and scrape opposite sides of the same disk.

14. A method of oil recovery as in claim 11 which further includes forming the scraper assembly with at least one ribbon carried in a conductor and with a portion of the ribbon extending outwardly from the conductor and forming the ribbon so that it curves upwardly and inwardly toward and to the conductor, and in mounted condition pressing the edge of the ribbon against a side of the rotating disk so that from the sides of the rotating disk is scraped the accumulated oil which is fed to an accumulator and so constructing the scraper assembly that the extending ribbon portions engage facing sides of adjacent rotating disks.

15. A method of oil recovery as in claim 11 which further includes forming the ribbon of Nylon approximately one thirty-second of an inch in thickness.

16. A method of oil recovery as in claim 11 which further includes providing a cover for the recovery apparatus by which the disks and the conductors associated with the scrapers are shielded from spray, waves and other sources of fluid which would add unwanted fluid to the oil scraped from the rotating disks.

* * * * *